(12) United States Patent
Ashrafiuon et al.

(10) Patent No.: US 7,190,141 B1
(45) Date of Patent: Mar. 13, 2007

(54) EXOSKELETAL DEVICE FOR REHABILITATION

(75) Inventors: Hashem Ashrafiuon, Wayne, PA (US); Mehdi Nikkhah, Wayne, PA (US)

(73) Assignee: Villanova University, Villanova, PA (US)

( * ) Notice: Subject to any disclaimer, the term of this patent is extended or adjusted under 35 U.S.C. 154(b) by 0 days.

(21) Appl. No.: 11/342,371

(22) Filed: Jan. 27, 2006

(51) Int. Cl.
*B25J 5/00* (2006.01)

(52) U.S. Cl. .......................... 318/568.12; 318/568.14; 318/568.2; 607/48; 607/49; 602/23; 602/26

(58) Field of Classification Search ........... 318/568.12, 318/568.13, 568.14, 568.2; 607/48, 49; 602/23, 602/26

See application file for complete search history.

(56) References Cited

U.S. PATENT DOCUMENTS

| | | | | |
|---|---|---|---|---|
| 4,557,257 A | * | 12/1985 | Fernandez et al. | 602/5 |
| 4,697,808 A | * | 10/1987 | Larson et al. | 482/51 |
| 4,711,242 A | * | 12/1987 | Petrofsky | 607/49 |
| 4,760,850 A | * | 8/1988 | Phillips et al. | 607/49 |
| 5,020,790 A | * | 6/1991 | Beard et al. | 482/4 |
| 5,054,476 A | * | 10/1991 | Petrofsky et al. | 602/16 |
| 5,476,441 A | * | 12/1995 | Durfee et al. | 602/23 |
| 5,961,542 A | * | 10/1999 | Agarwala | 607/63 |

OTHER PUBLICATIONS

Behrman et al.; Locomotor training after human spinal cord injury: a series of case studies; Physical Therapy; Jul. 2000; vol. 80, No. 7; pp. 688-700.

Hornby et al.; Robotic-assisted, body-weight-supported treadmill training in individuals following motor incomplete spinal cord injury; Physical Therapy; Jan. 2005, vol. 85(1); pp. 52-66.

A.D. Kuo; Stabilization of lateral motion in passive dynamic walking; International Journal of Robotoics Research; Sep. 1999, vol. 18, No. 19; pp. 917-930.

H. Ashrafiuon and R.S. Erwin; Sliding control approach to underactuated multibody systems; Proceedings of the American Control Conference; Jul. 2004; pp. 1283-1288.

Nikkhah et al., Sliding mode control of underactuated biped robots; Proceedings of ASME IMECE; Nov. 2005; Paper No. 29362; pp. 1-7.

McGeer; Passive dynamic walking: International Journal of Robotics Research; Apr. 1990; vol. 9, No. 2; pp. 62-82.

Goswami et al.; Limit cycles and their stability in a passive bipedal gait; Proceeding of IEEE International Conference on Robotics and Automation; 1996.

(Continued)

*Primary Examiner*—Rina Duda
(74) *Attorney, Agent, or Firm*—Stradley Ronon Stevens & Young, LLP

(57) ABSTRACT

A modular exoskeletal device adapted to fit the lower extremities of a patient during rehabilitation. The device has only two actuators during the standing stage of rehabilitation. Two additional actuators can be added, as modules, during the walking stage of rehabilitation. The actuators are affixed to the patient and provide controlled motion to at least one of the joints of the patient. A stationary control unit is separated from the patient. The control unit communicates with and directs the actuators, and has a hybrid control algorithm, such that the actuator forces are adjusted as the patient regains control of some joint motions, which is based upon the sliding-mode control theory. A back brace is affixed to the patient and helps to keep the torso of the patient in a stable, substantially vertical position.

17 Claims, 6 Drawing Sheets

OTHER PUBLICATIONS

Thuilot et al.; Bifurcation and chaos in a simple passive bipedal gait; Proceedings —IEEE International Conference on Robotics and Automation; 1997; vol. 1; pp. 792-798.

Garcia et al.; Simplest walking model: Stability, complexity, and scaling: Journal of Biomechanical Engineering, Transactions of the ASME; Feb. 1998; vol. 120, No. 2; pp. 281-288.

Garcia et al.; Efficiency, speed, and scaling of two-dimensional passive-dynamic walking; Dynamics and Stability of Systems; 2000; vol. 15, No. 2; pp. 75-99.

Collins et al.; A three-dimensional paasive-dynamic walking robot with two legs and knees; International Journal of Robotics Research; Jul. 2001; vol. 20, No. 7; pp. 607-615.

Adolfsson et al.; 3D passive walkers: finding periodic gaits in the presence of discontinuities; Nonlinear Dynamics; 2001; vol. 24, No. 2; pp. 205-229.

G.W. Howell and J. Baillieul; Simple controllable walking mechanisms which exhibit bifurcations; Proceedings of the IEEE Conference on Decision and Control; Dec. 1998; vol. 3; pp. 3027-3032.

Vukobratovic et al.; Biped Locomotion; Scientific Fundamentals of Robotics; Springer-Verlag; 1990; Berlin, Germany.

Takanishi et al., Realization of dynamic walking by the biped walking robot wl-10rd; Proceedings of '85 International Conference on Advanced Robotics; 1985; pp. 459-466.

Takanishi et al., Realization of dynamic biped walking stabilized by trunk motion on a sagittally uneven surface; Proceedings. IROS '90. IEEE International Workshop on Intelligent Robots and Systems: 1990: vol. 1: pp. 323-330.

Yamaguchi et al., Development of a bipedal humanoid robot-control method of whole body cooperative dynamic biped walking; Proceedings of IEEE International Conference on Robotics and Automation: May 1999; pp. 368-374.

Honda Corporation; ASIMO Website; 2003; http://world.honda.com/ASIMO.

H. Miura and I. Shimoyama; Dynamic walk of a biped; International Journal of Robotics Research; Summer 1984; vol. 3, No. 2; pp. 60-74.

J. Furusho and M. Masubuchi; Control of a dynamical biped locomotion system for steady walking; Journal of Dynamic Systems, Measurement and Control; Jun. 1986; vol. 108. No. 2: pp. 111-118.

Kajita et al., Dynamic walking control of a biped robot along a potential energy conserving orbit; IEEE Transactions on Robotics and Automation; Aug. 1992, vol. 8, No. 4; pp. 431-438.

S. Kajita and K. Tani; Experimental study of biped dynamic walking in the linear inverted pendulum mode; Proceedings—IEEE International Conference on Robotics and Automation; 1995; vol. 3; pp. 2885-2891.

Raibert et al., Comparative simulation study of three control techniques applied to a biped robot; Proceedings of the IEEE International Conference on Systems, Man and Cybernerics; Jul. 1993; vol. 1; pp. 494-502.

Grishin et al.; Dynamic walking of a vehicle with two telescopic legs controlled by two drives; International Journal of Robotics Research; Apr. 1994; vol. 13, No. 2; pp. 137-147.

Mitobe et al.; Nonlinear feedback control of a biped walking robot; Proceedings IEEE International Conference on Robotics and Automation; Jun. 1995; pp. 2865-2870.

J.H. Park and K.D. Kim; Biped robot walking using gravity-compensated inverted pendulum mode and computed torque control; Proceedings-IEEE International Conference on Robotics and Automation; May 1998; vol. 4; pp. 3528-3533.

Kajita et al.; The 3d linear inverted pendulum mode: A simple modeling for a biped walking pattern generation; IEEE International Conference on Intelligent Robots and Systems: Nov. 2001: vol.1; pp. 239-246.

Y. Hurmuzlu; Dynamics of bipedal gait: part I—objective functions and the contact event of a planar five-link biped; Journal of Applied Mechanics, Transactions ASME; Jun. 1993: vol. 60. No. 2: pp. 331-336.

J.E. Pratt; Exploiting inherent robustness and natural dynamics in the control of bipedal walking robots; Ph.D. Thesis, Cumputer Science Department, Massachusetts Institute of Technology, Cambridge, MA; 2000.

M.W. Spong; Passivity based control of the compass gait biped; Proceedings of the 14th World Congress, International Federation of Automatic Control; 1999; vol. 3; pp. 19-23.

C. Chevallereau; Time-scaling control for an underactuated biped robot; IEEE Transactions on Robotics and Automation; Apr. 2003; vol. 19; pp. 362-368.

Grizzle et al., Asymptotically stable walking for biped robots: Analysis via systems with impulse effects; IEEE Transactions on Automatic Control; Jan. 2001; vol. 46; pp. 51-64.

Plestan et al.; Stable walking of a 7-DOF biped robot; IEEE Transactions on Robotics and Automation; Aug. 2003; vol. 19; pp. 653-668.

S. Miossec and Y. Aoustin; A simplified stability study for a biped walk with underactuated and overacctuated phases; IEEE Transactions on Automatic Control; Jul. 2005; vol. 24 No. 7; pp. 537-551.

A. Chemori and A. Loria; Control of a planar underactuated biped on a complete walking cycle; IEEE Transactions on Automatic Control; May 2004; vol. 49, No. 5; pp. 838-843.

Nikkhah et al.; Saggital optimal gait of biped robot during double support phase (dsp); Proceedings of the International Conference on Mechatronics and Information Technology; Dec. 2003: Jecheon, Korea.

H. Hemami and B.F. Wyman; Modellng and control of constrained dynamic systems with application to biped locomotion in the frontal plane; IEEE Transactions on Automatic Control: Aug. 1979: vol. AC-24. No. 4. pp. 526-535.

Mitobe et al.; Control of a biped walking robot during the double support phase; Auton Robots; 1997; vol. 4, No. 3; pp. 287-296.

Sonoda et al.; Approach to biped robot control utilized redundacny in double support phase; IECON Proceedings (Industrial Electronics Conference); 1997; vol. 3; pp. 1332-1336.

X. Mu and Q. Wu; Development of a complete dynamic model of a planar five-link biped and sliding mode control of its locomotion during the double support phase; International Journal of Control; May 2004; vol. 77. No. 8: pp. 789-799.

R.S. Mosher; Handyman to hardiman; SAE Automotive Engineering Congress; 1967; SAE Paper No. 670088; Detroit, MI.

General Electric; Lightweight exoskeletons with controllable actuators; 1967; http://davidszondy.com/future/robot/hardiman.htm.

M.E. Rosheim; Man-amplifying exoskeleton; SPIE, Mobile Robots IV; 1989; vol. 1195; pp. 402-411.

Weiss et al.; Exoskeletal systems for neuromuscular rehabilitation; 1999; http://www.nasatech.com/Briefs/May99/NP020370.html.

Colombo et al.; Driven gait, orthosis to do locomotor training of paraplegic patients; Proceedings of the 22nd Annual EMBS International Conference; Jul. 2000 pp. 3159-3163.

H. Kawamoto and Y. Sankai; Abstract of Emg-based hybrid assistive leg for walking aid using-forward controller; International Conference on Control, Automation and Systems; 2001; pp. 190-193.

H. Kawamoto; Comfortable power assist control method for walking aid by hal-3; 2002 IEEE International Conference on Systems, Man and Cybernetics; 2002; Tsukuba, Japan.

H. Kawamoto and Y. Sankai; Power asslst system hal-3 for gait disorder person; Computers Helping People with Special Needs 8th International Conference. ICCHP 2002: pp. 196-203.

Kawamoto et al., Power assist method for hal-3 using emg-based feedback controller; International Conference on Control, Automation and Systems; 2003; pp. 1648-1653.

Berkeley Robotics Laboratory; Berkeley lower extremity exoskeleton: 2004; http://bleex.me.berkeley.edu/bleex.htm.

Huang et al.; Hybrid control of the berkeley lower extremity exoskeleton (bleex); Proceedings of ASME IMECE; 2005; Paper No. 80109; pp. 1-8.

Yamamoto et al.; Stand alone wearable power assisting suit—sensing and control systems; Proceedings of IEEE International Workshop on Robot and Human Interactive Communication; Sep. 2004; pp. 661-666.

Ferris et al., Powered lower limb orthoses for gait rehabilitation; Topics in Spinal Cord Injury Rehabilitation; 2005; vol. 11, No. 2; pp. 34-49.

Pratt et al., The roboknee: An exoskeleton for enhancing strength and endurance during walking; Proceedings of IEEE International Conference on Robotics and Automation; Apr. 2004; pp. 2430-2435.

Bar-Cohen et al., Lightweight exoskeletons with controllable actuators; 2004; http://www.nasatech.com/Briefs/Oct04/NPO30558.html.

S.K. Agrawal and A. Fattah; Theory and design of an orthotic device for full or partial gravity-balancing of a human leg during motion; IEEE Transactions on Neural Systems and Rehabilitation Engineering Jun. 2004 vol. 12 No. 2 pp. 157-165.

Acosta-Marquez and Bradley; The analysis, design and implementation of a model of an exoskeleton to support mobility; Proceedings of IEEE 9th Interntl Conference on Rehabilitation Robotics; Jul. 2005; pp. 99-102.

K. Kong and D. Jeon; Design and control of a new tendon-driven exoskeletal lower body power assistive device; Proceedings of ASME IMECE; Nov. 2005, Paper No. 80800; pp. 661-666.

Nikkhah et al., Stability and robusness issues in sliding mode control of underactuated bipeds; Submitted to the American Control Conference; Jun. 2006; Minneapiolis, MN.

Nikkhah et al.; Stable walking of an underactuated biped robot using sliding mode control; IEEE Transactions on Robotics; Nov. 2005.

Goldstein et al.; Classical Mechanics; Pearson Education; 2001; 3rd Edition.

V.I. Utkin; Variable structure systems with sliding modes; IEEE Transactions on Automatic Control; Apr. 1977; vol. 22; pp. 212-222.

I. Wickelgren; Teaching the spinal cord to walk; Science; Jan. 1998; vol. 279; pp. 319-321.

Wang et al.; Dynamic motion planning for the design of robotic gait rehabilitation; Journal of Biomechanical Engieering, Transactions of the ASME; Aug. 2005; vol. 127; pp. 672-679.

\* cited by examiner (a) The single support phase (b) The double support phase

FIG. 5

Appendix 1 - Kinematic and dynamic equation details

The detailed closed loop kinematic constraints in Eq. (1):

$$l_1 sin(q_0 + q_1 + q_2) + l_2 sin(q_0 + q_2) - l_2 sin(q_0 - q_3) - l_1 sin(q_0 - q_3 + q_4) = 0 \\ l_1 cos(q_0 + q_1 + q_2) + l_2 cos(q_0 + q_2) - l_2 cos(q_0 - q_3) - l_1 cos(q_0 - q_3 + q_4) = 0 \quad (20)$$

where $l_1$ and $l_2$ are the lengths of femur and tibia, respectively. Note that, the two ankle angles of the stance and swing legs relative to the vertical are $q_s = q_0 + q_1 + q_2$ and $q_e = q_0 - q_3 + q_4$, respectively. The elements of the Jacobian matrix J in Eq. (2) are derived using the partial derivatives presented in Eq. (4) as:

$$\begin{aligned}
J_{11} &= l_1 cos(q_0 + q_1 + q_2) & J_{12} &= J_{11} + l_2 cos(q_0 + q_2) \\
J_{14} &= -l_1 cos(q_0 - q_3 + q_4) & J_{13} &= -J_{14} + l_2 cos(q_0 - q_3) \\
J_{21} &= -l_1 sin(q_0 + q_1 + q_2) & J_{22} &= J_{21} - l_2 sin(q_0 + q_2) \quad (21) \\
J_{24} &= l_1 sin(q_0 - q_3 + q_4) & J_{23} &= -J_{24} - l_2 sin(q_0 - q_3) \\
J_{15} &= J_{12} - J_{13} & J_{25} &= J_{22} - J_{23}
\end{aligned}$$

and the elements of its time derivative $\dot{J}$ in Eq. (3) are:

$$\begin{aligned}
\dot{J}_{11} &= l_1 cos(q_0 + q_1 + q_2)(\dot{q}_0 + \dot{q}_1 + \dot{q}_2); & \dot{J}_{12} &= \dot{J}_{11} + l_2 cos(q_0 + q_2)(\dot{q}_0 + \dot{q}_2) \\
\dot{J}_{14} &= -l_1 cos(q_0 - q_3 + q_4)(\dot{q}_0 - \dot{q}_3 + \dot{q}_4); & \dot{J}_{13} &= -\dot{J}_{14} + l_2 cos(q_0 - q_3)(\dot{q}_0 - \dot{q}_3) \\
\dot{J}_{21} &= -l_1 sin(q_0 + q_1 + q_2)(\dot{q}_0 + \dot{q}_1 + \dot{q}_2); & \dot{J}_{22} &= \dot{J}_{21} - l_2 sin(q_0 + q_2)(\dot{q}_0 + \dot{q}_2) \quad (22) \\
\dot{J}_{24} &= l_1 sin(q_0 - q_3 + q_4)(\dot{q}_0 - \dot{q}_3 + \dot{q}_4); & \dot{J}_{23} &= -\dot{J}_{24} - l_2 sin(q_0 - q_3)(\dot{q}_0 - \dot{q}_3) \\
\dot{J}_{15} &= \dot{J}_{12} - \dot{J}_{13}; & \dot{J}_{25} &= \dot{J}_{22} - \dot{J}_{23}
\end{aligned}$$

The inertia matrix D in Eq. (5) is a symmetric matrix in terms of q:

$$\begin{aligned}
D_{11} &= I_1 + m_1 d_1^2 + 2m_2 l_1^2 + m_0 l_1^2 + m_1 l_1^2 \\
D_{12} &= D_{21} = D_{11} + l_1(m_2(l_2 + d_2) + (m_0 + m_1)l_2)\cos(q_1) \\
D_{14} &= D_{41} = -m_1 l_1 (l_1 - d_1)\cos(q_1 + q_2 + q_3 - q_4) \\
D_{13} &= D_{31} = -D_{14} + l_1(m_2(l_2 - d_2) + l_2 m_1)\cos(q_1 + q_2 + q_3) \\
D_{15} &= D_{51} = D_{12} - D_{13} + m_0 d_0 l_1 \cos(q_1 + q_2) \\
D_{22} &= 2D_{12} - D_{11} + I_2 + (m_0 + m_1)l_2^2 + m_2(l_2^2 + d_2^2) \\
D_{24} &= D_{42} = D_{14} - m_1(l_1 - d_1)l_2 \cos(q_2 + q_3 - q_4) \\
D_{23} &= D_{32} = -D_{24} + (m_2(l_2 - d_2) + l_2 m_1)(l_1 \cos(q_1 + q_2 + q_3) + l_2 \cos(q_2 + q_3)) \\
D_{25} &= D_{52} = D_{22} - D_{23} + m_0 d_0 (d_0 + l_1 \cos(q_1 + q_2) + l_2 \cos(q_2))) \\
D_{44} &= I_1 + m_1(l_1 - d_1)^2 \\
D_{33} &= D_{44} + I_2 + m_2(l_2 - d_2)^2 + m_1 l_2^2 + 2m_1(l_1 - d_1)l_2 \cos(q_4) \\
D_{34} &= D_{43} = -D_{44} - m_1(l_1 - d_1)l_2 \cos(q_4) \\
D_{35} &= D_{53} = D_{23} - D_{33} \\
D_{45} &= D_{54} = D_{24} - D_{34} \\
D_{55} &= D_{25} - D_{35} + I_0 + m_0 d_0 (d_0 + l_1 \cos(q_1 + q_2) + l_2 \cos(q_2))
\end{aligned}$$

FIG. 5 (continued)

where $d_0$, $d_1$ and $d_2$ are the distances from the ankle, knee, and hip joints to the center of mass of femur, tibia, and torso, respectively. The elements of gravitational moment vector G are given in terms of q as:

$$\begin{aligned}
G_1 &= -g(m_1(d_1 + l_1) + l_1(2m_2 + m_0))\sin(q_0 + q_1 + q_2) \\
G_2 &= G_1 - g(m_2(d_2 + l_2) + l_2(m_0 + m_1))\sin(q_0 + q_2) \\
G_4 &= m_1 g(l_1 - d_1)\sin(q_0 - q_3 + q_4) \\
G_3 &= -G_4 - g((l_2 - d_2)m_2 + m_1 l_2)\sin(q_0 - q_3) \\
G_5 &= G_2 - G_3 - m_0 g d_0 \sin(q_0)
\end{aligned}$$

The elements of the vector of centrifugal and coriolis moments C are derived in terms of q and $\dot{q}$ as:

$$\begin{aligned}
C_1 =\ & (m_2(l_2 + d_2) + (m_0 + m_1)l_2)l_1(\dot{q}_0 + \dot{q}_2)^2 \sin(q_1) + m_0 d_0 l_1 \dot{q}_0^2 \sin(q_1 + q_2) - \\
& (m_2(l_2 - d_2) + m_1 l_2)l_1(\dot{q}_0 - \dot{q}_3)^2 \sin(q_1 + q_2 + q_3) - \\
& m_1 l_1(l_1 - d_1)(\dot{q}_0 - \dot{q}_3 + \dot{q}_4)(\dot{q}_0 - \dot{q}_3 + \dot{q}_4 + 2(\dot{q}_1 + \dot{q}_2))\sin(q_1 + q_2 + q_3 - q_4) \\
C_2 =\ & -(m_2(l_2 + d_2) + (m_0 + m_1)l_2)l_1 \dot{q}_1(2\dot{q}_0 + \dot{q}_1 + 2\dot{q}_2)\sin(q_1) - \\
& (m_2(l_2 - d_2) + m_1 l_2)(\dot{q}_0 - \dot{q}_3)^2(l_2 \sin(q_2 + q_3) + l_1 \sin(q_1 + q_2 + q_3)) + \\
& m_0 d_0 \dot{q}_0^2(l_2 \sin(q_2) + l_1 \sin(q_1 + q_2)) - \\
& m_1(l_1 - d_1)(\dot{q}_0 - \dot{q}_3 + \dot{q}_4)^2(l_2 \sin(q_2 + q_3 - q_4) + l_1 \sin(q_1 + q_2 + q_3 - q_4)) \\
C_3 =\ & m_1(l_1 - d_1)l_2 \dot{q}_4(2\dot{q}_0 - 2\dot{q}_3 + \dot{q}_4)\sin(q_4) - \\
& (m_2(l_2 - d_2) + m_1 l_2)l_2(\dot{q}_0 + \dot{q}_2)^2 \sin(q_2 + q_3) - \\
& (m_2(l_2 - d_2) + m_1 l_2)l_1(\dot{q}_0 + \dot{q}_1 + \dot{q}_2)^2 \sin(q_1 + q_2 + q_3) - \\
& m_1(l_1 - d_1)l_2(\dot{q}_0 + \dot{q}_2)^2 \sin(q_2 + q_3 - q_4) \\
& m_1(l_1 - d_1)l_1(\dot{q}_0 + \dot{q}_1 + \dot{q}_2)^2 \sin(q_1 + q_2 + q_3 - q_4) - \\
C_4 =\ & m_1(l_1 - d_1)(l_2(\dot{q}_0 - \dot{q}_3)^2 \sin(q_4) + l_2(\dot{q}_0 + \dot{q}_2)^2 \sin(q_2 + q_3 - q_4) \\
& + l_1(\dot{q}_0 + \dot{q}_1 + \dot{q}_2)^2 \sin(q_1 + q_2 + q_3 - q_4)) \\
C_5 =\ & -(m_2(l_2 + d_2) + (m_0 + m_1)l_2)l_1 \dot{q}_1(2\dot{q}_0 + \dot{q}_1 + 2\dot{q}_2)\sin(q_1) - \\
& m_0 d_0(l_2 \dot{q}_2(2\dot{q}_0 + \dot{q}_2)\sin(q_2) + l_1(\dot{q}_1 + \dot{q}_2)(\dot{q}_2 + \dot{q}_1 + 2\dot{q}_0)\sin(q_1 + q_2)) - \\
& m_1(l_1 - d_1)l_2 \dot{q}_4(2\dot{q}_0 - 2\dot{q}_3 + \dot{q}_4)\sin(q_4) + \\
& (m_2(l_2 - d_2) + m_1 l_2)l_2(\dot{q}_2 + \dot{q}_3)(2\dot{q}_0 + \dot{q}_2 - \dot{q}_3)\sin(q_2 + q_3) + \\
& (m_2(l_2 - d_2) + m_1 l_2)l_1(\dot{q}_1 + \dot{q}_2 + \dot{q}_3)(2\dot{q}_0 + \dot{q}_1 + \dot{q}_2 - \dot{q}_3)\sin(q_1 + q_2 + q_3) + \\
& m_1(l_1 - d_1)l_2(\dot{q}_3 + \dot{q}_2 - \dot{q}_4)(\dot{q}_2 + 2\dot{q}_0 - \dot{q}_3 + \dot{q}_4)\sin(q_2 + q_3 - q_4) + \\
& m_1(l_1 - d_1)l_1(\dot{q}_1 + \dot{q}_2 + \dot{q}_3 - \dot{q}_4)(2\dot{q}_0 + \dot{q}_1 + \dot{q}_2 - \dot{q}_3 + \dot{q}_4)\sin(q_1 + q_2 + q_3 - q_4)
\end{aligned}$$

EXOSKELETAL DEVICE FOR REHABILITATION

TECHNICAL FIELD

The present invention relates generally to equipment used to facilitate rehabilitation in human beings suffering infirmity and, more particularly, to an exoskeleton device useful for that purpose.

BACKGROUND OF THE INVENTION

Rehabilitation is a required but difficult process for patients trying to recover the full control of their hips, knees, or other parts of their body. Some of the most important types of rehabilitation include neuromuscular rehabilitation for neurally impaired patients due to spinal cord injury and muscle or ligament rehabilitation for patients with one or more of hip, knee, or ankle replacement surgeries. The spinal cord is capable of relearning the ability to walk through proper training even when cut off from the brain. See I. Wickelgren, "Teaching the spinal cord to walk," *Science*, 279:319–21 (1998); C. Wang, J. Bobrow, and D. Reinkensmeyer, "Dynamic motion planning for the design of robotic gait rehabilitation," *Journal of Biomechanical Engineering, Transactions of the ASME*, 127:672–79 (2005). A large proportion of people with spinal cord injury who sustain motor incomplete lesions can regain some recovery in their walking ability. Symmetrical movements of lower extremities consistent with normal physiological gait patterns provide some of the critical sensory cues necessary for maintaining and enhancing walking ability. See A. Behrman and S. Harkema, "Locomotor training after human spinal cord injury: a series of case studies," *Physical Therapy*, 80(7): 688–700 (2000).

Although procedures such as hip replacement surgery can be very beneficial, the best way to maximize those benefits is through proper rehabilitation. The American Academy of Physical Medicine and Rehabilitation (AAPMR) reports that, as Baby Boomers age, the number of total hip replacements is expected to increase by more than 60 percent in the next 30 years. Physical therapy is extremely important in the overall outcome of any joint-replacement surgery. The goals of physical therapy are to prevent contractures, improve patient education, and strengthen muscles through controlled exercises. Contractures result from scarring of the tissues around the joint. Contractures do not permit full range of motion and, therefore, impede mobility of the replaced joint.

A promising solution for assisting patients with spinal cord injury, those with joint replacement surgery, and many other mobility-impaired patients during rehabilitation is to design exoskeletal devices. It has already been shown that motorized robotic-assisted devices can be very helpful in training individuals to regain their walking ability following motor incomplete spinal cord injury. See T. Hornby, D. Zemon, and D. Campbell, "Robotic-assisted, body-weight-supported treadmill training in individuals following motor incomplete spinal cord injury," *Physical Therapy*, 85(1): 52–66 (2005). Exoskeletal devices have the potential to be used during the sitting, standing, and walking stages of rehabilitation. But such a versatile device is not currently available.

In view of the shortcomings of the known approaches, there is an apparent need for an improved exoskeletal device for patients requiring rehabilitation. It is therefore an object of the present invention to provide a modular exoskeletal device that permits components to be added as rehabilitation progresses through the sitting, standing, and walking stages. Thus, for example, only two actuators are provided during the standing stage while four actuators are provided during the walking stage. An additional object is to provide stationary control and computing software and hardware so that the patient need not carry this extra load. A related object is to provide an exoskeletal device offering reduced weight and power requirements tailored to meet the specific needs of a patient during each stage of rehabilitation. Another object is to maintain the torso of the patient in a stable position without effort from the patient.

Additional objects and advantages of this invention will be apparent from the following detailed description.

BRIEF SUMMARY OF THE INVENTION

To achieve these and other objects, and in view of its purposes, the present invention provides a modular exoskeletal device adapted to fit the lower extremities of a patient during rehabilitation. The device has only two actuators during the standing stage of rehabilitation. Two additional actuators can be added, as modules, during the walking stage of rehabilitation. The actuators are affixed to the patient and provide controlled motion to at least one of the joints of the patient. A stationary control unit is separated from the patient. The control unit communicates with and directs the actuators, and has a hybrid control algorithm, such that the actuator forces are adjusted as the patient regains control of some joint motions, which is based upon the sliding-mode control theory. A back brace is affixed to the patient and helps to keep the torso of the patient in a stable, substantially vertical position.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

FIG. 4(*b*) illustrates the double support phase of the sagittal biped model helpful to understand the exoskeletal rehabilitation device; and FIG. 5 provides the kinematic constraint equations and the elements of the Jacobian matrix and its derivative used to calculate a biped mathematical model for the present invention.

DETAILED DESCRIPTION OF THE INVENTION

Figure 1:
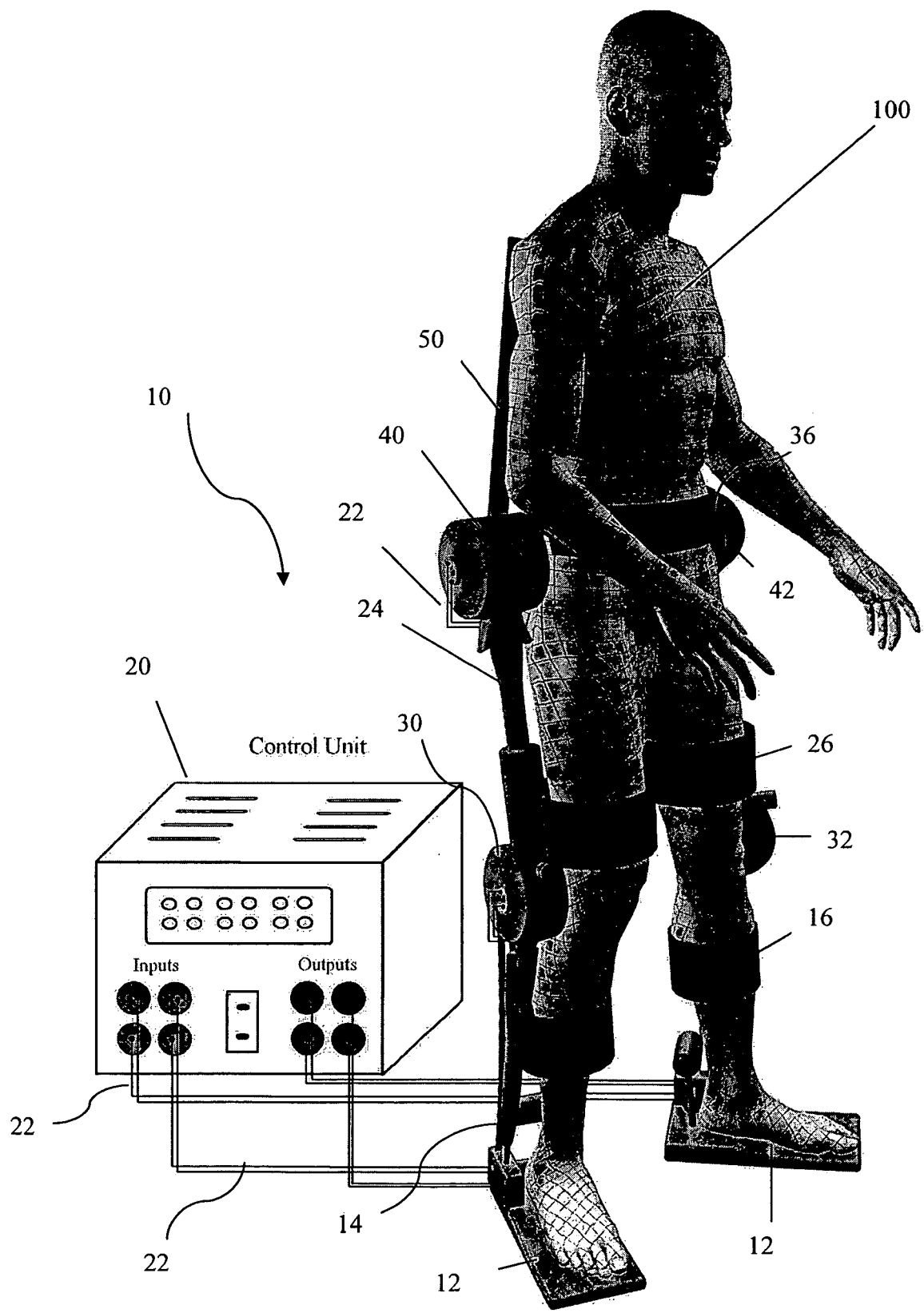
FIG. 1 illustrates an exoskeletal rehabilitation device according to one embodiment of the present invention.

The lightweight modular exoskeletal device (a biped robot) of the present invention fits the lower extremities of patients requiring rehabilitation due to neuromuscular injuries; hip, knee, ankle replacement surgery; or other infirmity. Although the device could be used in different stages of rehabilitation such as sitting, standing, and walking, one feature of the device is in assisting the patient to exercise in the standing position. The design is modular such that two rotary actuators located at any of the possible four hip and knee joints can be used during the earlier standing phase of rehabilitation thus reducing weight and power requirements. The control and computing hardware are stationary such that the patient does not have to carry any additional load. During the walking stage of rehabilitation, all four actuators are installed. The device is attached to patients as illustrated in FIG. 1 and provides controlled knee and hip motions while keeping the torso in a stable position without any effort from the patient or additional hardware. A series of control algorithms provide the appropriate motions of the hip, knee, or both required for the specific phase and type of rehabilitation while simultaneously holding the upper body stable.

A. Introduction

Turning to FIG. 1, an embodiment of the exoskeletal device 10 according to the present invention is shown in place on a human patient 100. The exoskeletal device 10 has a platform 12, on which the feet of the patient 100 rest, that contacts the ground or floor. A pair of first connecting rods 14 extend from the platform 12 upward in parallel to the legs of the patient 100. A pair of first straps 16 are connected to the first connecting rods 14. The first straps 16 encircle the lower portions of the legs of the patient 100 to affix the exoskeletal device 10 to the patient 100.

At least one of the first connecting rods 14 may have a first actuator 30 (including an encoder, a motor, wiring, and other electrical components) attached at its top (opposite the platform 12) adjacent one of the knee joints of the patient 100. If desired, a second actuator 32 may be attached at the top of the other first connecting rod 14 adjacent the opposite knee joint of the patient 100. The modular nature of the exoskeletal device 10 allows the caregiver to easily add and subtract actuators 30, 32 as desired to meet the specific needs of an individual patient 100.

Similarly, if desired, a pair of second connecting rods 24 extend from the pair of first connecting rods 14 upward in parallel to the thighs of the patient 100. A pair of second straps 26 are connected to the second connecting rods 24. The second straps 26 encircle the thighs of the patient 100 to affix the exoskeletal device 10 to the patient 100.

At least one of the second connecting rods 24 may have a third actuator 40 attached at its top (opposite the first connecting rod 14) adjacent one of the hip joints of the patient 100. If desired, a fourth actuator 42 may be attached at the top of the other second connecting rod 24 adjacent the opposite hip joint of the patient 100. The modular nature of the exoskeletal device 10 allows the caregiver easily to add and subtract actuators 40, 42 as desired to meet the specific needs of an individual patient 100.

Although not shown in FIG. 1, additional actuators may be included as part of the exoskeletal device 10. Such additional actuators may be located, for example, adjacent the ankle joints of the patient 100. The modular nature of the exoskeletal device 10 gives the exoskeletal device 10 flexibility in accommodating individual patients.

Moreover, the exoskeletal device 10 can provide additional structural support for the patient 100. For example, as shown in FIG. 1, the exoskeletal device 10 has a back brace 50 supporting the patient 100. A third strap 36 is connected to the back brace 50. The third strap 36 encircles the waist of the patient 100 to affix the exoskeletal device 10 to the patient 100.

A control unit 20 is provided as part of the exoskeletal device 10. The control unit 20, which contains the computing software and hardware, is stationary such that the patient 100 does not have to carry the additional load of the control unit 20. The control unit 20 has inputs and outputs, as shown in FIG. 1, to interact with the components of the exoskeletal device 10 connected to the patient 100. A plurality of wires 22 may interconnect the control unit 20 with those components, communicating signals to and from the components. More specifically, the wires 22 may traverse the inside of connecting rods 14 and 24 to engage those of the actuators 30, 32, 40, 42 used in a particular application. Alternatively, the signals exchanged between the control unit 20 and the components of the exoskeletal device 10 connected to the patient 100 may be transmitted wirelessly.

Figure 2:
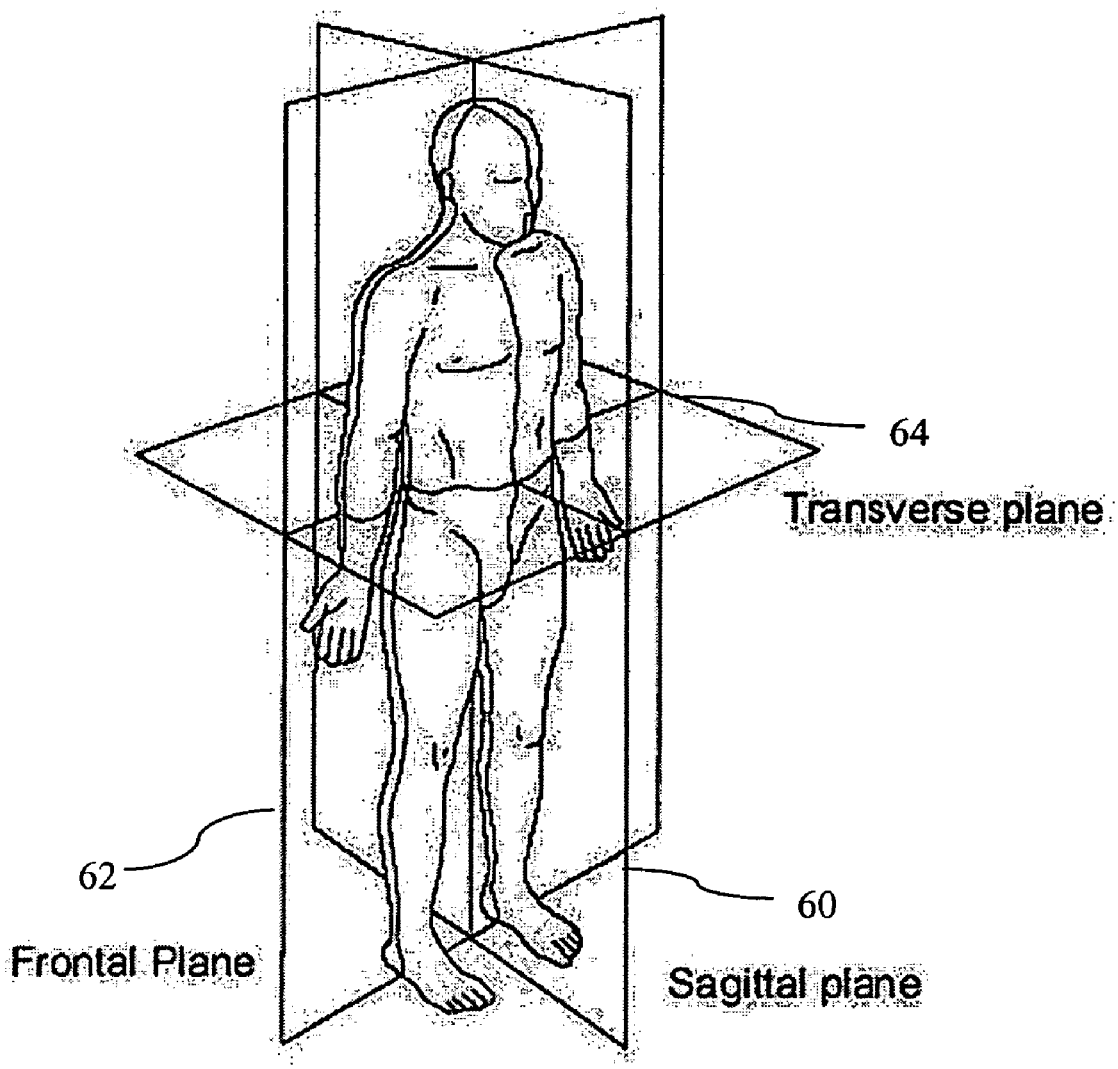
FIG. 2 illustrates the human planes of section helpful to understand the exoskeletal rehabilitation device.

Exoskeletal devices such as the exoskeletal device 10 are generally described and modeled as biped robots. Therefore, a general model of biped robots is described in order to explain the exoskeletal device 10 of the present invention. There are three different planes in which a biped robot or a human subject can be observed. The sagittal plane 60 is the one which divides the body into the right and left sections. The frontal plane 62 divides the body into front and back sections. The transverse plane 64 is perpendicular to the sagittal and frontal planes. These three planes are illustrated in FIG. 2.

Biped motion is normally studied in the sagittal plane 60 as a simplification of the full three-dimensional (3D) model. The reason is to avoid extra degrees of freedom (DOF) at the joints in order to minimize the number of the actuators during rehabilitation which is normally and primarily in the sagittal plane 60. Because the motion of the biped/human in the sagittal plane 60 is decoupled from the motion in the frontal plane 62, see A. Kuo, "Stabilization of lateral motion in passive dynamic walking," *International Journal of Robotics Research,* 18(19):917–930 (1999) ("the Kuo reference"), actuators can be added to the exoskeletal device 10 at a later stage for 3D joint rotations. In addition, these joints can be set to have a free motion out of the sagittal plane 60 based on patient comfort. Thus, the analysis is primarily reduced to a biped in the sagittal plane 60.

Figure 3:
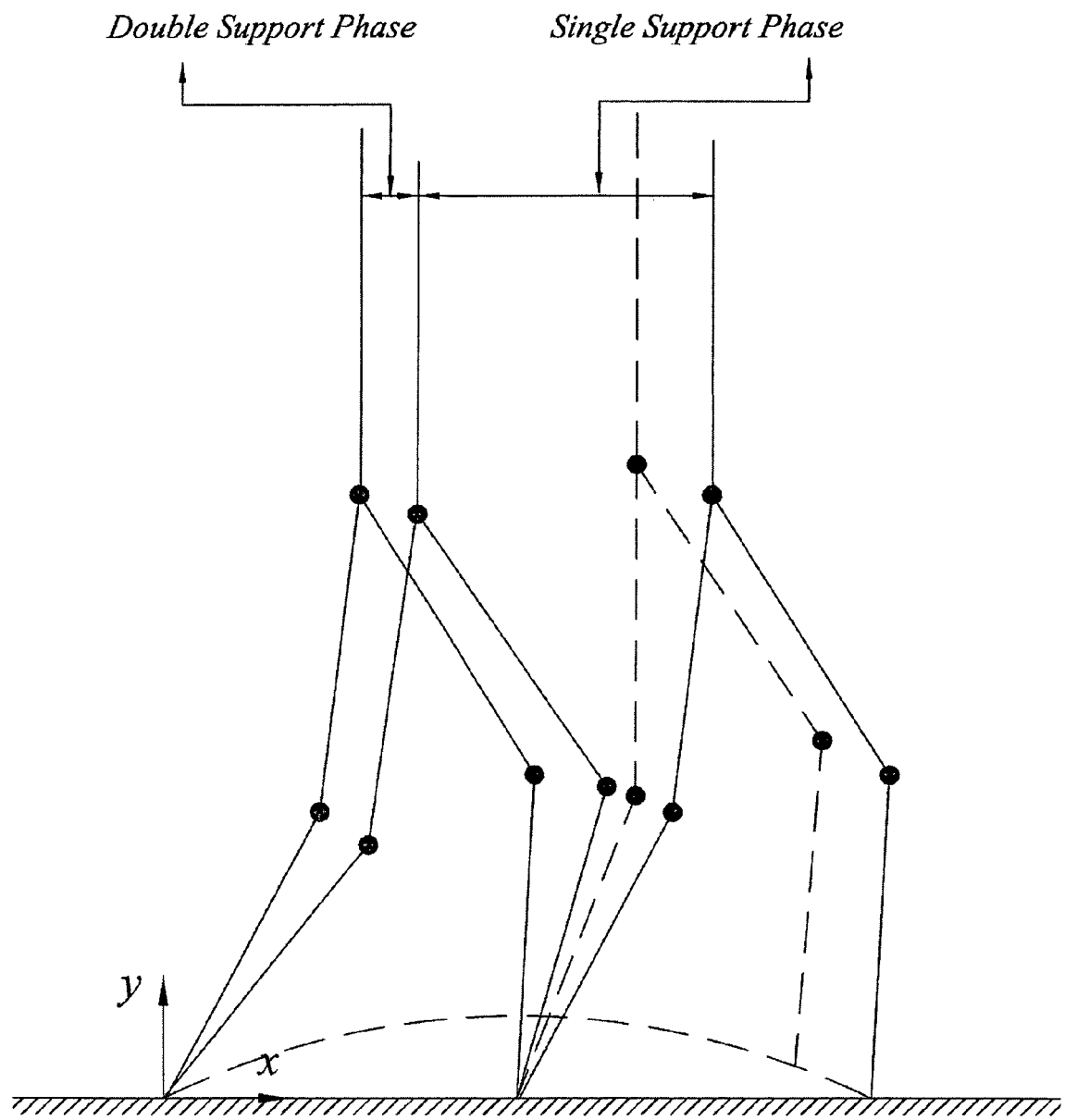
FIG. 3 illustrates the walking phases helpful to understand the exoskeletal rehabilitation device.

A biped in the sagittal plane 60 can be considered as a planar kinematic chain consisting of two legs and a torso. The legs are identical and symmetrical and are connected to the torso at the hip. Each leg consists of two links representing the upper (femur) and lower (tibia) parts connected via the knee. The foot may be considered as a third link but is typically omitted from the model. Of the two legs, the one in contact with the ground is called the "stance leg" while the one moving forward to take a step is called the "swing leg." The walking cycle consists of the single and double support phases. The single support phase, also called the swing phase, is when only one foot is in contact with the ground. This phase resembles an open kinematic chain with 5 DOF. The double support phase is when both feet are in contact with the ground. This phase resembles a closed kinematic chain with 3 DOF. The single and double support phases are illustrated in FIG. 3.

The present invention is primarily concerned with the earlier stages of rehabilitation when the patient 100 remains in the standing position; i.e., the double support phase. The basic premise of the model is that the biped motion in the double support phase can be fully controlled with only two actuators located to directly rotate only two joints. Meanwhile, the two actuators also keep the torso in the stable vertical position without any effort from the patient. The number of actuators can be increased to four during the walking phase of rehabilitation. Note that, in both phases, the control problem is under-actuated where there are more DOF than actuators thus complicating the control problem.

As one aspect of the present invention, sliding-mode control laws are developed for the under-actuated biped (the exoskeletal device 10) during the double support phase. Sliding-mode control is a fast and effective method which is robust with respect to modeling errors and bound external disturbances. An approach based on sliding-mode control has already been developed for under-actuated mechanical systems. See H. Ashrafiuon and R. Erwin, "Sliding control approach to underactuated multibody systems," in *Proceedings of the American Control Conference*, pages 1283–88 (2004) ("the Ashrafiuon reference") (incorporated into this application by reference). The method has been specifically applied to control the motion of a 5-DOF biped by four actuators located at the hip and knee joints during the single support phase. See M. Nikkhah, H. Ashrafiuon, and F. Fahimi, "Sliding mode control of underactuated biped robots," in *Proceedings of ASME IMECE, paper no* 79362 (2005) ("the Nikkhah et al. reference") (also incorporated into this application by reference).

The present invention extends this approach to closed-loop mechanical systems, in general, and the biped in the double support phase, in particular. Only two actuators are required to generate the rehabilitative hip and knee motions during the (standing) double support phase. Control and stability of under-actuated, closed-loop mechanical systems such as bipeds during the double support phase has yet to be addressed. A series of control algorithms are developed to provide the appropriate hip, knee, or both hip and knee motions required by the rehabilitative process using two actuators located at any combination of the hip and knee joints. The control algorithms can be refined to best fit the specific forms of rehabilitation while simultaneously keeping the upper body vertical without any effort from the patient. The design of the mechanical structure and components of the exoskeleton device can be implemented using computer-aided-design (CAD) software.

The control and computing hardware of the control unit 20 are stationary to avoid the patient 100 having to carry additional weight. The exoskeletal device 10 has at least two features among its most important. First, the exoskeletal device 10 is modular such that components can be easily removed or added as needed. Second, the exoskeletal device 10 uses the minimum number of actuators depending on the rehabilitation stage. Only the required actuators for the specific rehabilitation process are attached to the patient 100, thus minimizing weight and power requirements. All four actuators 30, 32, 40, 42 are installed only when the patient 100 is ready for a full walking cycle. The exoskeletal device 10 aids the patient 100 in keeping the upper body stable during both standing and walking phases of rehabilitation.

B. Framework for the Invention

The most basic objective in biped research is to maintain stability. The biped stability problem can be categorized into static, quasi-static, and dynamic stability. Static stability is achieved when the projection of the biped's center of mass is located in the polygon of the support. A quasi-static stable motion is one when the projection of the biped's center of pressure is located in the polygon of the support. The center of pressure is the point on the ground where the resultant ground reaction forces act. In legged locomotion literature, the center of pressure is usually referred to as the Zero Moment Point (ZMP). A dynamically stable motion is one when the center of pressure is out of the polygon of the support during the motion.

Research in the field of bipedal walking can be divided into several categories based upon the biped's characteristics: 2D bipeds, with motions taking place in only the sagittal plane 60, versus 3D bipeds, with motions taking place in and out of the sagittal plane 60. The motion of the biped in the sagittal plane 60 is decoupled from the motion of the biped in the frontal plane 62, thus a separate control algorithm is developed for the motion in each of these planes to control the 3D walking. The dynamic analysis and control of the biped only in the sagittal plane 60 is a reasonable analysis for human walking.

B.1. Biped Locomotion and Control Research

In recent decades, the interest of researchers in bipedal walking has been constantly increasing in both the biomechanics and robotics areas. Anthropomorphic fascination and locomotion of biped robots in environments with discontinuous support are among the reasons why walking and running of biped robots is a popular area of scientific research and literature. Better scientific analysis of bipedal walking results in better understanding of human gait and its intrinsic characteristics. Other important reasons include the potential impact on the design and development of human-assisting devices.

To date, a wide range of research has been performed in bipedal dynamic analysis, stability analysis, and control. A literature overview of bipedal walking analysis and control is summarized below. Bipedal walkers can be divided into two broad categories: the powered bipedal walkers and the passive dynamic walkers. Passive walkers can move smoothly down a slope, based on contraction between the biped and gravitational energy, without any external actuation or power. This kind of walking is energy efficient and relies on its natural dynamics; the applicable control law is simple. The research on passive dynamic walking originated in 1990. See T. McGeer, "Passive dynamic walking," *International Journal of Robotics Research*, 9(2):62–82 (1990). McGeer got the idea from a simple toy which was able to move on an inclined plane based on gravity. He showed that the biped can attain a stable periodic walking according to a linearized mathematical analysis. McGeer's walker could walk down a slope of 1.4 degrees with the speed of 0.4 m/s.

In 1996, Goswami and colleagues used a nonlinear dynamic model to study the passive walking of a two-link planar bipedal with prismatic legs called the "Compass-Gait Walker." See A. Goswami, B. Espiau, and A. Keramane, "Limit cycles and their stability in a passive bipedal gait," in *Proceedings of IEEE International Conference on Robotics and Automation*, 1:246–51 (1996). They used a control torque between the legs to control the biped's total energy and enlarge the basin of attraction of its limit cycle. Thuilot et al. showed that the passive walker can exhibit bifurcation and chaos under certain conditions. See B. Thuilot, A. Goswami, and B. Espiau, "Bifurcation and chaos in a simple passive bipedal gait," *Proceedings—IEEE International Conference on Robotics and Automation*, 1:792–98 (1997). Ruina and his students at Cornell University built several passive walkers and performed detailed dynamic analysis of 2D and 3D bipeds. See M. Garcia, A. Chatterjee, A. Ruina, and M. Coleman, "Simplest walking model: Stability, complexity, and scaling," *Journal of Biomechanical Engineering, Transactions of the ASME*, 120(2):281–88 (1998); M. Garcia, A. Chatterjee, and A. Ruina, "Efficiency, speed, and scaling of two-dimensional passive-dynamic walking," *Dynamics and Stability of Systems*, 15(2):75–99 (2000); and S. Collins, M. Wisse, and A. Ruina, "A three-dimensional passive-dynamic walking robot with two legs and knees," *International Journal of Robotics Research*, 20(7):607–15 (2001).

Adolfsson et al. studied the passive walking of a 10 DOF, 3D biped. See J. Adolfsson, H. Dankowicz, and A. Nordmark,. "3D passive walkers: finding periodic gaits in the presence of discontinuities," *Nonlinear Dynamics*, 24(2): 205–29 (2001). Howell and Baillieul investigated a semi-active, three-link, planar biped with a torso. See G. Howell and J. Baillieul, "Simple controllable walking mechanisms which exhibit bifurcations," in *Proceedings of the IEEE Conference on Decision and Control*, volume 3, pages 3027–32 (1998). They considered an actuator to control the torso motion. Kuo showed that, in 3D passive walking, lateral stability is decoupled from dynamics of the biped in the sagittal plane 60. See the Kuo reference. He used an active control scheme to adjust the foot lateral placement while the biped was moving down an inclined plane.

In the case of non-passive or powered bipedal walkers, there are a large number of prototypes which have been developed by different research groups. As far as walking control is concerned, several algorithms have been implemented to achieve stable walking. These algorithms can be separated into two different groups. The first group of algorithms is based on predefined reference trajectories in order to resemble human walking motion or to achieve a minimum energy walking. The second group of algorithms is based on natural dynamics and inherent properties of walking. This group uses heuristic control algorithms to generate stable walking.

One of the earliest control methods based on predefined reference trajectories was introduced by Vukobratovic et al. See M. Vukobratovic, B. Borovac, D. Surla, and D. Stokic, Biped Locomotion, SpringerVerlag, Berlin, Germany (1990). Their control method was based on ZMP feedback. As noted above, ZMP is the point on the ground where the resultant of the ground reaction forces act; this point is contained in the support polygon of the robot. The control method based on the ZMP criterion states that, if the ZMP point is contained in the support polygon of the robot, then the biped walk is stable and the robot will not topple. This is a model-based control method which requires a complex control structure. In this algorithm, feedback from the foot is required to sense the forces.

Takanishi et al. used the path of the ZMP to analytically calculate link trajectories and insure walking stability. See A. Takanishi, M. Ishida, Y. Yamazaki, and I. Kato, "Realization of dynamic walking by the biped walking robot WL-10RD," in Proceedings of '85 *International Conference on Advanced Robotics*, pages 454–66. They implemented the control algorithm on a 12 DOF biped called WL-10RD, which weighed 80 kg and moved with a speed of 0.1 μm/s and step length of 40 cm. Later, Takanishi et al. used a heavy trunk, in their 8 DOF robot prototype called WL-12R III, to stabilize the robot walking on uneven surfaces. See A. Takanishi, H. Lim, M. Tsuda, and I. Kato, "Realization of dynamic biped walking stabilized by trunk motion on a sagittally uneven surface," in *Proceedings. IROS '90; IEEE International Workshop on Intelligent Robots and Systems*, volume 1, pages 323–30 (1990). The ZMP and lower-limb trajectories were defined prior to walking. The torso motion ensured that the ZMP stayed within the polygon of the support. The torso motion was defined by solving the dynamic equation and known lower-limb and ZMP trajectories. The ZMP method has also been used to control the WABIAN series robots, see J. Yamaguchi, E. Soga, S. Inoue, and A. Takanishi, "Development of a bipedal humanoid robot—control method of whole body cooperative dynamic biped walking," in *Proceedings of IEEE International Conference on Robotics and Automation*, pages 368–74 (1999), and Honda's robot called ASIMO, see Honda Corporation. ASIMO website, 2003, http://world.honda.com/ASIMO.

Miura and Shimoyama developed five different robots called Biper 1 through Biper 5. See H. Miura and I. Shimoyama, "Dynamic walk of a biped," *International Journal of Robotics Research*, 3(2):60–74 (1984) ("the Miura and Shimoyama reference"). The key idea in control was the assumption of a small range of motion, linearization of the biped dynamics, and consequently the use of linear control theory. Furusho and Masubuchi used PID control to follow piecewise linear reference trajectories. See J. Furusho and M. Masubuchi, "Control of a dynamical biped locomotion system for steady walking," *Journal of Dynamic Systems, Measurement and Control*, 108(2): 111–18 (1986).

Kitija et al. developed a planar 6 DOF robot named Meltran. See S. Kajita, T. Yamaura, and A. Kobayashi, "Dynamic walking control of a biped robot along a potential energy conserving orbit," *IEEE Transactions on Robotics and Automation*, 8(4):431–38 (1992); S. Kajita and K. Tani, "Experimental study of biped dynamic walking in the linear inverted pendulum mode," in *Proceedings—IEEE International Conference on Robotics and Automation*, volume 3, pages 2885–91 (1995). They simplified the dynamic model of the biped by assuming mass-less legs and an inertial upper body and assuming that the center of mass is moving at a constant height. With these assumptions, the dynamics become linear and a linear controller was used to control its motion.

Raibert and Tzafestas used PID control, sliding-mode control, and computed torque control for a 5 DOF planar biped and compared these methods through simulation. See M. Raibert, S. Tzafestas, and C. Tzafestas, "Comparative simulation study of three control techniques applied to a biped robot," in *Proceedings of the IEEE International Conference on Systems, Man and Cybernetics*, volume 1, pages 494–502 (1993). The advantages of the sliding-mode control became apparent based on their simulations. Grishin and Formalsky developed a biped at Moscow State University which was a 3 DOF biped robot with telescopic legs. See A. Grishin, A. Formalsky, A. Lensky, and S. Zhitomirsky, "Dynamic walking of a vehicle with two telescopic legs controlled by two drives," *International Journal of Robotics Research*, 13(2):137–47 (1994). Two actuators were used to change the lengths of the legs and one actuator was located at the hip. PID control was used to track predefined reference trajectories.

Mitobe et al. used computed torque control to control the center of mass and swing leg end positions. See K. Mitobe, N. Mori, K. Aida, and Y. Nasu, "Nonlinear feedback control of a biped walking robot," in *Proceedings IEEE International Conference on Robotics and Automation*, volume 3, pages 2865–70 (1995). Park and Kim used computed torque control with gravity compensation to follow predefined reference trajectories. See J. Park and K. Kim, "Biped robot walking using gravity-compensated inverted pendulum mode and computed torque control," in Proceedings—IEEE International Conference on Robotics and Automation, volume 4, pages 3528–33 (1998). Kijita, et al. followed a procedure similar to that disclosed in the Miura and Shimoyama reference and simplified the biped model as an inverted pendulum. See S. Kajita, F. Kanehiro, K. Kaneko, K. Yokoi, and H. Hirukawa, "The 3d linear inverted pendulum mode: A simple modeling for a biped walking pattern generation," in IEEE International Conference on Intelligent Robots and Systems, volume 1, pages 239–46 (2001). They used computed torque control to follow reference trajectories defined by the inverted pendulum model. The reference trajectories were calculated online because the dynamic model was very simple and did not require extensive calculations.

Other control methods, in addition to time dependent control algorithms, are based on natural dynamics and inherent properties of walking. These methods are time invariant. Below is a description of some of the more significant works in this area. Hurmuzlu considered a 5 DOF planar biped robot in which the motion of the biped was completely characterized in terms of gait parameters. See Y. Hurmuzlu, "Dynamics of bipedal gait: part I-objective functions and the contact event of a planar five-link biped," Journal of Applied Mechanics, Transactions ASME, 60(2): 331–36 (1993). The stability analysis was based on the parametric formulation of the gait. Pratt investigated the inherent robustness and dynamics of bipedal walking in order to design simple and low impedance controls called "virtual mode control." See J. Pratt, "Exploiting Inherent Robustness and Natural Dynamics in the Control of Bipedal Walking Robots," Ph.D. Thesis, Computer Science Department, Massachusetts Institute of Technology, Cambridge, Mass. (2000). Pratt built a biped prototype named Flamingo at the MIT Leg laboratory. Spong discussed feedback control strategies for a compass gait biped by shaping the energy of the system. See M. Spong, "Passivity based control of the compass gait biped," in Proceedings of the 14th World Congress. International Federation of Automatic Control, volume 3, pages 19–23 (1999). In his approach, the passive limit cycle is slope invariant.

B.2. Biped Under-Actuated Control Research

In general, researchers have focused on design and control of fully actuated bipeds, where there is an actuator for each DOF. In the case of under-actuated bipeds, the reduction in the number of the actuators can effectively reduce the energy expenditure and simplify the design of the biped but the control problem and the stability analysis become more difficult. Because the feet are normally not modeled as separate links in under-actuated bipeds, neither static stability nor ZMP stability can be considered for their analysis. Hence, a very challenging issue in under-actuated biped research is generating dynamically stable walking; the projection of the center of pressure is outside the polygon of the support.

Chevallereau proposed a method to control the geometric evolution of under-actuated bipeds where the feedback dependence on time has been removed by time scaling. See C. Chevallereau, "Time-scaling control for an underactuated biped robot," IEEE Transactions on Robotics and Automation, 19:362–68 (2003). The stability of the control law was investigated through angular momentum of the biped about the contact point during the single support phase. Chevallereau was able to control the walking of a 5 DOF biped prototype named RABBIT. The method reduces the control problem to a fully actuated one by introducing a virtual time dependent input and assumes no modeling error or disturbances.

Grizzle et al. controlled the walking of an under-actuated 3 DOF planar biped based on defining selected outputs as functions of the robot configuration variables. See J. Grizzle, G. Abba, and F. Plestan, "Asymptotically stable walking for biped robots: Analysis via systems with impulse effects," IEEE Transactions on Automatic Control, 46:51–64 (2001). In their work, the stability analysis has been investigated with reduction of the Poincare map to numerical calculation of a 1D problem. Plestan et al. used the approach presented by Grizzle et al. to control a 5 DOF planar biped. See F. Plestan, J. Grizzle, E. Westervelt, and G. Abba, "Stable walking of a 7-DOF biped robot," IEEE Transactions on Robotics and Automation, 19:653–68 (2003). Miossec and Aoustin assumed that the 5 DOF under-actuated biped follows the desired motion based on the controller development by Grizzle et al. and investigated the stability of the phase through dynamics of the shin angle with a 1D Poincare map. See S. Miossec and Y. Aoustin, "A simplified stability study for a biped walk with underactuated and overacctuated phases," IEEE Transactions on Automatic Control, 24:537–51 (2005). In their study, they considered the stability of the motion during the complete walking cycle.

Chemori and Loria used a partial feedback linearization method to control the entire walking cycle including the double support phase. See A. Chemori and A. Loria, "Control of a planar underactuated biped on a complete walking cycle," IEEE Transactions on Automatic Control, 49:838–43 (2004). In their work, the stability of both the single and double support phases was investigated through development of a Lyapunov function along the trajectory and the impact phase was treated as external perturbation. The torso motion stability proof for this method relies on an accurate dynamic model and cancellation of the nonlinear terms. Nikkhah et al. developed a robust sliding-mode control law for a 5 DOF planar biped robot where all four configuration angles were commanded to follow precise trajectories while the un-actuated torso was stabilized at a desired angle near the upright position. See the Nikkhah et al. reference. They were able to establish stability of the single support phase and the entire walking cycle despite uncertainties in the biped model.

B.3. Double Support Phase Research

Most of the research in the area of bipedal walking has been concentrated on the single support phase; the double support phase is assumed to be instantaneous. In the double support phase, the number of DOF decreases because of the holonomic kinematic constraints imposed to keep both legs in contact with the ground. The motion of the biped in this phase is more stable compared to the single support phase, but the dynamic modeling is more complicated because the constraint forces must also be considered. See M. Nikkhah, M. Rostami, and F. Towhidkhah, "Saggital optimal gait of biped robot during double support phase (DSP)," in Proceedings of the International Conference on Mechatronics and Information Technology, Jecheon, Korea (Dec. 4–6, 2003).

Development of a control algorithm for biped motion in the double support phase has been investigated by several researchers. Hemami et al. considered a constrained, three-link, biped robot. See H. Hemami and B. Wyman, "Modeling and control of constrained dynamic systems with application to biped locomotion in the frontal plane," IEEE Transactions on Automatic Control, (4):526–35 (1979).

They derived the constraint forces as explicit functions of system states and inputs and developed the required feedback gains in the vicinity of the operating point. Mitobe et. al. used a computed torque method to control the motion of a 4 DOF biped robot in the double support phase. See K. Mitobe, N. Mori, Y. Nasu, and N. Adachi, "Control of a biped walking robot during the double support phase," Auton Robots, 4(3):287–96 (1997). They defined a set of desired trajectories for the Cartesian coordinates of a point on the trunk and assumed that the orientation of the trunk is fixed during the motion. In their work, the controller was also designed to stabilize the constraint forces.

Sonoda et al. regarded a 4 DOF biped in the double support phase as a redundant manipulator and the acceleration reference to each joint was written based on the null space vector. See N. Sonoda, T. Murakami, and K. Ohnishi, "Approach to biped robot control utilized redundancy in double support phase," in IECON Proceedings (Industrial Electronics Conference), volume 3, pages 1332–36 (1997). In their method, various control configurations can be realized based on the selection of the performance function. The sliding-mode control of a 5 DOF biped during the double support phase has also been addressed. See X. Mu and Q. Wu, "Development of a complete dynamic model of a planar five-link biped and sliding mode control of its locomotion during the double support phase," International Journal of Control, 77(8):789–99 (2004). Mu and Wu chose the hip Cartesian position and trunk orientation as the independent generalized coordinates and eliminated the constraint forces from the equations of motion. In their work, a procedure was developed to simplify the derivation of the equations of motion.

B.4. Exoskeleton Research

The study of exoskeletal power assist systems was first initiated by General Electric in the late 1960's on a 30 DOF, full-body exoskeleton which was called Hardiman. See http://davidszondy.com/future/robot/hardiman.htm, SAE Paper No. 670088, "Lightweight exoskeletons with controllable actuators," General Electric (1967); R. Mosher, "Handyman to Hardiman," in SAE Automotive Engineering Congress, Detroit, Mich. (1967). Hardiman was developed in order to increase the carrying and lifting capabilities of soldiers. Master-slave control was implemented and the structure of the overall exoskeleton consisted of a lightweight, sensing, inner exoskeleton and a load-bearing, outer exoskeleton. The human operator manipulated the inner exoskeleton and the outer exoskeleton was driven by hydraulic actuators provided with power assist. The project was not successful, however, due to uncontrollable and sometimes violent motion of the device. Another early suggested exoskeleton was a 7 DOF man-amplifying arm with two-axis (universal) joints. See M. Rosheim, "Man-amplifying exoskeleton," SPIE, Mobile Robots IV, 1195: 402–11 (1989).

Exoskeletal systems have been suggested for rehabilitation of neurally impaired patients and astronauts exercising in space. See J. Weiss, A. Bejczy, B. Jau, and G. Lilienthal, "Exoskeletal systems for neuromuscular rehabilitation," (1999), http://www.nasatech.com/Briefs/May99/NP020370.html. A driven gait orthosis was developed that can move a patient's legs on a treadmill. See G. Colombo, M. Jrg, and V. Dietz, "Driven gait orthosis to do locomotor training of paraplegic patients," in Proceedings of the 22nd Annual EMBS International Conference, pages 3159–63, Chicago, Ill. (Jul. 23–28, 2000).

Another device called HAL (Hybrid Assistive Leg) was developed to provide walking aid for people with gait disorder. See H. Kawamoto and Y. Sankai, "EMG-based hybrid assistive leg for walking aid using feedforward controller," in International Conference on Control, Automation and Systems, pages 190–03 (2001); H. Kawamoto, "Comfortable power assist control method for walking aid by HAL-3," in 2002 IEEE International Conference on Systems, Man and Cybernetics, volume 4, pages 447–452 (2002); H. Kawamoto and Y. Sankai, "Power assist system HAL-3 for gait disorder person," in Computers Helping People with Special Needs 8th International Conference, ICCHP2002; Proceedings (Lecture Notes in Computer Science Vol. 2398), pages 196–203 (2002); and H. Kawamoto, S. Lee, S. Kanbe, and Y. Sankai, "Power assist method for HAL-3 using EMG-based feedback controller," in International Conference on Control, Automation and Systems, pages 1648–53 (2003). HAL is integrated with the human subject and has a hybrid control system that consists of autonomous posture control and a comfortable power assist controller based on biological feedback and predictive feed forward. The actuators used in HAL are DC servo motors which generate assist moments at the hip and the knee joints. The design of HAL was also based on the master-slave system. Using the exoskeleton as a master in a master-slave system enables the operator (master) to exclusively control the device (slave).

The BLEEX (Berkeley Lower Extremity Exoskeleton) was developed in 2004 at the Human Engineering Laboratory of the University of California at Berkeley. See Berkeley Robotics Laboratory, "Berkeley lower extremity exoskeleton," (2004), http://bleex.me.berkeley.edu/bleex.htm; L. Huang, J. Steger, and H. Kazerooni, "Hybrid control of the Berkeley lower extremity exoskeleton (BLEEX)," in Proceedings of ASME IMECE, Paper No. 80109 (2005). The BLEEX allows the wearer (pilot) to carry significant loads for different purposes such as military, fire fighting, etc. The overall concept is that the human provides an intelligent control system for the exoskeleton while the exoskeleton actuators provide the necessary strength for walking. Hydraulic actuators are used for the BLEEX because large forces are required in military applications.

Other exoskeletal devices include pneumatically actuated devices developed by Yamamoto and colleagues for nurses, see K. Yamamoto, M. Ishii, H. Noborisaka, and K. Hyodo, "Stand alone wearable power assisting suit—sensing and control systems," in Proceedings of IEEE International Workshop on Robot and Human Interactive Communication, pages 661–66 (2004), and powered orthoses developed at the University of Michigan, see D. Ferris, G. Sawicki, and A. Domingo, "Powered lower limb orthoses for gait rehabilitation," Topics in Spinal Cord Injury Rehabilitation, 11(2):34–49 (2005). Researchers have suggested an exoskeletal power-assistance device for the knee using a series of elastic actuators, see J. Pratt, B. Krupp, J. Morse, and S. Collins, "The roboknee: An exoskeleton for enhancing strength and endurance during walking," in Proceedings of IEEE International Conference on Robotics and Automation, pages 2430–35 (2004), and a lightweight exoskeleton that uses adjustable graphite/epoxy struts and is attached to the body by belts, see Y. Bar-Cohen, C. Mavrodis, J. Melli-Huber, and A. Fisch, "Lightweight exoskeletons with controllable actuators, (2004), http://www.nasatech.com/Briefs/Oct04/NPO30558.html.

A gravity-balancing device was developed for a single human leg during motion. See S. Agrawal and A. Fattah, "Theory and design of an orthotic device for full or partial gravity-balancing of a human leg during motion," IEEE Transactions on Neural Systems and Rehabilitation Engi-

*neering*, 12(2):157–65 (2004). A motorized crutch device has also been suggested to enhance the mobility of individuals with lower limb disabilities. See C. Acosta-Marquez and D. Bradley, "The analysis, design and implementation of a model of an exoskeleton to support mobility," in *Proceedings of the IEEE* 9th International Conference on Rehabilitation Robotics, pages 99–102, Chicago, Ill. (Jun. 28–Jul. 1, 2005). Jeon et al. developed a tendon-driven exoskeletal power assistance device for the lower body. See K. Kong and D. Jeon, "Design and control of a new tendon-driven exoskeletal lower body power assistive device," in Proceedings of ASME IMECE, Paper No. 80800, pages 661–66 (2005). Fuzzy control logic was used to generate the joint torques required to assist several motions such as sitting, standing, and walking. In their work, EMG sensors were used to calculate the magnitude of the assistance provided by the device.

B.5. The Inventors' Related Work

In the case of under-actuated bipeds, the reduction in the number of the actuators has the advantages of reduced energy expenditure, simplified design, and potential use for rehabilitation purposes related to leg muscles and joints. A tradeoff exists, however, in that the control problem and stability analysis become more difficult. The inventors recently applied the sliding-mode control approach to control a planar, 5 DOF biped in the single support phase with four actuators located at the knee and hip joints; i.e., only the torso was not directly actuated. See the Nikkhah et al. reference; M. Nikkhah, H. Ashrafiuon, and F. Fahimi, "Stability and robustness issues in sliding mode control of underactuated bipeds," *Submitted to the American Control Conference*, Minneapolis, Minn. (Jun. 14–16, 2006); and M. Nikkhah, H. Ashrafiuon, and F. Fahimi, "Stable walking of an underactuated biped robot using sliding mode control," *Submitted to the IEEE Transactions on Robotics* (2005). The work was based on the sliding-mode control application to an under-actuated system, as disclosed in the Ashrafiuon reference. The usefulness of the exoskeletal device 10 of the present invention is established based on the development of similar control algorithms for the under-actuated biped in the double support phase where only two actuators are required. Control and stability of under-actuated bipeds during the double support phase has not been addressed. The basic mathematical framework for such a control algorithm is developed in the following section.

C. Biped Mathematical Model and Control

The development of a mathematical model and control for the exoskeletal device 10 of the present invention is provided below.

C.1. Kinematics

Figure 4:
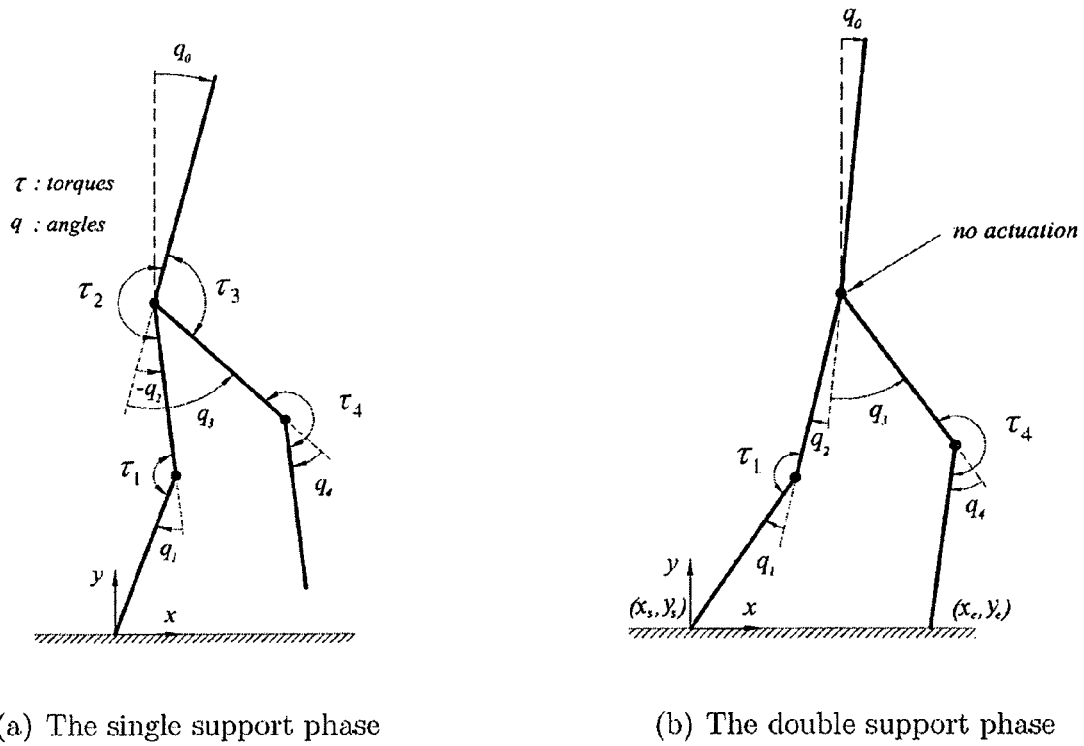
FIG. 4(*a*) illustrates the single support phase of the sagittal biped model helpful to understand the exoskeletal rehabilitation device.

A sagittal model of an anthropomorphic biped robot in the xy sagittal plane 60 is presented in FIGS. 4(*a*) and 4(*b*). The model is a 5-link robot consisting of a torso and two identical legs, each having two links which are connected via knee joints. Two coaxial hip joints connect each leg to the torso and each joint has 1 DOF. As shown in FIG. 4(*a*), the contact of the feet to the ground has been modeled as a point contact with 1 DOF at each ankle joint. Therefore, the positions of the feet are fixed during this phase (standing phase of rehabilitation). The kinematic model may be represented with a generalized coordinate vector comprised of the four relative joint angles and the torso absolute angle $q=[q_1, q_2, q_3, q_4, q_0]^T$.

The biped in the single support phase has 5 DOF. Hence, all of the five generalized coordinates are independent. The double support phase is the phase when both feet are in contact with the ground. The swing leg end must be fixed at a prescribed location during the double support phase which imposes a set of two holonomic constraints due to the kinematic closed loop. The biped in the double support phase has 3 DOF and thus three independent generalized coordinates. The five generalized coordinates are related through the two closed loop constraint equations defined as:

$$\Phi(q) = \begin{bmatrix} \Phi_1(q) \\ \Phi_2(q) \end{bmatrix} = \begin{bmatrix} x_e - x_s - L \\ y_e - y_s \end{bmatrix} = 0 \quad (1)$$

where $(x_e, y_e)$ and $(x_s, y_s)$ denote the Cartesian positions of the swing and stance leg ends, respectively, and L is the step length. Differentiating the kinematic constraints of Eq. (1) with respect to time yields:

$$\dot{\Phi} = J\dot{q} = 0 \quad (2)$$

$$\ddot{\Phi} = J\ddot{q} + \dot{J}\dot{q} = 0 \quad (3)$$

where $J \in \Re^{(2\times 5)}$ is the Jacobian of the kinematic constraints in Eq. (1). The Jacobian matrix is derived as:

$$J = \frac{\partial \Phi}{\partial q} \quad (4)$$

The kinematic constraint equations and the elements of the Jacobian matrix and its derivative are listed as Appendix 1 in FIG. 5.

C.2. Equations of Motion

The equations of motion of the biped in the two phases are similar except for the addition of the constraint forces in the double support phase and the difference in the required minimum number of active actuators. During the single support phase, the connection between the stance leg and the ground is modeled as a pivot joint, the biped resembles an open chain, and the equations of motion can be written as:

$$D(q)\ddot{q} + C(q, \dot{q}) + G(q) = T \quad (5)$$

where $T = [\tau^T, 0]^T$, $\tau = [\tau_1, \tau_2, \tau_3, \tau_4]^T$ is the joint actuation torque vector, $D \in \Re^{(5\times 5)}$ is the inertia matrix, C is the vector of centrifugal and coriolis moments, and $G \in \Re^{(5\times 1)}$ is the vector of gravitational moments, respectively. Note that the biped is under-actuated because it has 5 DOF but only four actuators.

During the double support phase, the connections between both legs and the ground are modeled as pivot joints. In this case, the biped legs and the ground form a closed-loop, five-bar linkage and the two kinematic constraints in Eq. (1) must be imposed. The equations of motion of the biped in the double support phase are the same as the ones in the single support phase except for the addition of the constraint forces $J^T\lambda$:

$$D(q)\ddot{q} + C(q, \dot{q}) + G(q) = T + J^T\lambda \quad (6)$$

where $\lambda \in \Re^{(2\times 1)}$ is the vector of the LaGrange multipliers associated with the kinematic constraints.

C.3. Partitioning of the Equations

The dynamic system under holonomic constraints can be described by a set of independent generalized coordinates equal to the number of DOF of the system. See H. Goldstein, C. Poole, and J. Safko, *Classical Mechanics* (Pearson Education, Upper Saddle River, NJ, 3rd edition, 2001). The biped has 3 DOF and thus requires three independent coordinates but is controlled with only two actuators. Hence, the generalized coordinate vector is rearranged and partitioned into three parts: a set of two actuated independent joint angles, $q_a$, the independent torso absolute angle, $q_0$, and a set of two un-actuated dependent joint angles, $q_d$. Hence, $$q = [q_a^T, q_0, q_d^T]^T, \quad q_a = [q_{a1}, q_{a2}]^T, \quad q_D = [q_{d1}, q_{d2}]^T \quad (7)$$

where a1 and a2 indicate the selected independent joint coordinate numbers and d1 and d2 denote the remaining dependent joint coordinate numbers. The dependent generalized coordinates can be derived in terms of the independent ones using Eqs. (1), (2), and (3), $$\Phi(q_d, q_a) = 0 \quad (8)$$

$$\dot{q}_d = -J_d^{-1} J_a \dot{q}_a \quad (9)$$

$$\ddot{q}_d = -J_d^{-1}(J_a \ddot{q}_a + \dot{J}\dot{q}) \quad (10)$$

where the Jacobian matrix has been rearranged and partitioned as $J = [J_a, 0, J_d]$. Note that Eq. (8) forms a set of two simple nonlinear equations which can be easily solved. In general, the above equations have a solution as long as there is a kinematically viable closed loop chain; i.e., $J_d$ is nonsingular. Singular cases can be simply handled by arbitrary selection of one of the dependent coordinates. Similarly, the equations of motion in Eq. (6) can be partitioned as:

$$\begin{bmatrix} D_{aa} & D_{a0} & D_{ad} \\ D_{a0}^T & D_{00} & D_{0d} \\ D_{ad}^T & D_{0d}^T & D_{dd} \end{bmatrix} \begin{bmatrix} \ddot{q}_a \\ \ddot{q}_0 \\ \ddot{q}_d \end{bmatrix} + \begin{bmatrix} C_a \\ C_0 \\ C_d \end{bmatrix} + \begin{bmatrix} G_a \\ G_0 \\ G_d \end{bmatrix} = \begin{bmatrix} J_a^T \lambda \\ 0 \\ J_a^T \lambda \end{bmatrix} + \begin{bmatrix} u \\ 0 \\ 0 \end{bmatrix} \quad (11)$$

where $u = [\tau_{u1}, \tau_{u2}]^T$ is the actuation vector.

C.4. Control Formulation

According to the design of this embodiment of the present invention, there can be up to four actuators, one located at each joint. In the single support phase, all four actuators are required and active but the system is still under-actuated because there are 5 DOF. The control problem objective in this case is to follow the desired walking trajectory through direct actuation while (indirectly) keeping the torso stable near the vertical position. This control problem has been addressed in the previous work of the inventors. See the Nikkhah et al. reference. In the double support phase, the biped has 3 DOF and thus a minimum of two actuators are required. In this case, the two actuators can be located at any two joints to directly control the closed loop motion of the lower body while keeping the torso nearly upright. This problem has never before been addressed. The general form of the control law for the under-actuated biped in the double support phase is developed in this section.

The control algorithm is based on the sliding-mode control approach. The goal of sliding-mode control is to define asymptotically stable surfaces such that all system trajectories converge to these surfaces in finite time and slide along them until reaching their desired destination. See V. Utkin, "Variable structure systems with sliding modes," *IEEE Transactions on Automatic Control*, 22:212–22 (1977). The equations of motion of Eq. (11) and the kinematic acceleration equation of Eq. (10) can be solved simultaneously for the accelerations and the LaGrange multipliers. The general form of the solution for $q_a$ and $q_0$ can be written as:

$$\ddot{q}_a = f_a + b_a u \quad (12)$$

$$\ddot{q}_0 = f_0 + b_0^T u \quad (13)$$

where $b_a \in \Re^{(2 \times 2)}$, $b_0 \in \Re^{(2 \times 1)}$, $f_a$, and $f_0$ are functions of the generalized coordinates and velocities.

In sliding-mode control, first order sliding surfaces are normally defined in terms of position and velocity tracking errors. Define the position tracking error as $\tilde{q} = q - q^d$ where $q^d$ denotes the desired position vector or the reference trajectory. Because the system has two controllers, the two surfaces are defined as a combination of the tracking position and velocity errors in $q_a$ and $q_0$, similar to the approach introduced in the Ashrafiuon reference:

$$s = \dot{\tilde{q}}_a + \lambda_a \tilde{q}_a + \alpha_0 \dot{\tilde{q}}_0 + \lambda_0 \tilde{q}_0 \quad (14)$$

where a $\lambda_a \in \Re^{(2 \times 2)}$, $\alpha_0 \in \Re^{(2 \times 1)}$, and $\lambda_0 \in \Re^{(2 \times 1)}$ are the surface parameters which must be selected to produce stable and effective controllers. The reference trajectory in the double support phase corresponds to joint motions which must be predefined based on the rehabilitation technique.

The control law can be determined by setting the $\dot{s} = 0$ and following the standard sliding mode control procedure:

$$u = -(\hat{b}_a + \alpha_0 \hat{b}_0^T)^{-1}(\hat{f}_a + \alpha_0 \hat{f}_0 + \dot{s}_r k \text{sgn}(s)) \quad (15)$$

where "^" is used to denote the nominal or model values of the functions, "sgn" helps to provide system stability and robustness, $k \text{sgn}(s) = [k_1 \text{sgn}(s_1), k_2 \text{sgn}(s_2)]$, and $$\dot{s}_r = -\ddot{q}_a^d - \alpha_0 \ddot{q}_0^d + \lambda_a \dot{\tilde{q}}_a + \lambda_0 \dot{\tilde{q}}_0. \quad (16)$$

Based on sliding-mode control theory, for each surface $s_i$, we define $\frac{1}{2}(s_i)^2$ as the Lyapunov function and determine the control law that satisfies:

$$\frac{1}{2} \frac{d}{dt} s_i^2 = s \dot{s}_i \leq -\eta_i |s_i|; \quad i = 1, 2 \quad (17)$$

where $\eta_i > 0$. This proves that all system trajectories will reach the sliding surface in finite time. The bounds must be defined, however, for the uncertainty or estimation error in the model parameters. Let the positive functions $F_a \in \Re^{(2 \times 1)}$, $F_0$, and $\Delta \in \Re^{(2 \times 2)}$ denote the bounds on the estimation errors such that:

$$|f_{a_i} - \hat{f}_{a_i}| \leq F_{a_i}; \quad i = 1, 2 \quad |f_0 - \hat{f}_0| \leq F_0; \quad i = 1, 2 \quad b_a + \alpha_0 b_0^T = (I + \delta)(\hat{b}_a + \alpha_0 \hat{b}_0^T); \quad |\delta_{ij}| \leq \Delta_{ij}; \quad i = 1, 2; \, j = 1, 2. \quad (18)$$

Based on these bounds, we can determine the gain of the "sgn" function, k, such that the stability conditions of Eq. (17) are satisfied:

$$k = (I + \delta)^{-1}[F_a + \alpha_0 f_0 + \Delta |\hat{f}_a + \alpha_0 \hat{f}_0 + \dot{s}_r| + \eta] \quad (19)$$

A saturation function $\text{sat}(s/\phi)$ with boundary layer "$\phi$" may be defined as a continuous approximation of the "sgn" function to avoid the chattering typically associated with sliding-mode control. Hence, $k \text{sat}(s/\phi) = [k_1 \text{sat}(s_1/\phi_1), k_2 \text{sat}(s_2/\phi_2)]^T$ replaces sgn(s) in Eq. (15).

In the Nikkhah et al. reference, the control laws were derived such that all system trajectories were forced to reach sliding surfaces in finite time and stay there. The asymptotic stability of the surfaces was established locally based on linearization of the unactuated equation of motion. The surface parameters were numerically calculated to satisfy the stability criteria derived based on the linearized system.

The controller of Eq. (15) guarantees that all system trajectories will reach the surface by selecting $\alpha_0$ such that the term, $(\hat{b}_a+\alpha_0\hat{b}_0{}^T)^{-1}$, exists under any configuration. Once on the surface, however, there is no guarantee that the trajectory will lead to the desired origin. Stability of the surfaces can be established if the combination of the two linear surfaces of Eqs. (14) and the acceleration equation of Eq. (13) are proved to be stable. Following a similar procedure to the Nikkhah et al. reference, the stability of the motion can be established during the double support phase. For example, it can be clearly observed that $\lambda_a$ must be a positive definite (diagonal) matrix, and $\alpha_0$ and $\lambda_0$ must have positive elements. The specific criteria are developed through linear stability theory by substituting for the control law and linearizing Eq. (13) because the two surface equations are already linear. A search method can be developed and implemented to determine the surface parameters which satisfy all the required stability criteria.

The exoskeletal device 10 provides for neuromuscular and lower extremity joint rehabilitation during the standing and walking phases. The exoskeletal device 10 is modular and, hence, can be reconfigured for each phase of rehabilitation. A main advantage of the exoskeletal device 10 is its light weight; only the minimum number of actuators is required during each phase. The mathematic framework presented above shows that the exoskeletal device 10 provides the necessary knee and hip motions required by the rehabilitation process. The new control laws applicable during the double support phase can be used, along with previously developed control laws for the single support phase, to uniquely train even a neurally impaired patient to stand and walk and keep the upper body stable without requiring any effort from the patient. The control system is hybrid such that the actuator forces are adjusted as the patient regains control of some of his or her joint motions.

Although illustrated and described above with reference to certain specific embodiments and examples, the present invention is nevertheless not intended to be limited to the details shown. Rather, various modifications may be made in the details within the scope and range of equivalents of the claims and without departing from the spirit of the invention. It is expressly intended, for example, that all ranges broadly recited in this document include within their scope all narrower ranges which fall within the broader ranges.

What is claimed is:

1. A modular exoskeletal device adapted to fit the lower extremities of a patient during rehabilitation, the device comprising:
    only two actuators during the standing stage of rehabilitation, the actuators affixed to and independently acting upon the patient and providing automatically controlled motion to at least one of the joints of the patient;
    a stationary control unit separated from the patient and in communication with and automatically directing the actuators without patient actuation, the control unit including a hybrid mathematical control algorithm based upon the sliding-mode control theory such that the actuator forces are automatically adjusted as the patient regains control of some joint motions; and
    a back brace affixed to the patient, extending vertically between the waist and shoulders of the patient, and helping to keep the torso of the patient in a stable, substantially vertical position,
    wherein the modularity of the device permits incorporation of one or more additional actuators as needed by the patient.

2. The modular exoskeletal device as recited in claim 1 further comprising two additional actuators during the walking stage of rehabilitation.

3. The modular exoskeletal device as recited in claim 1 wherein the control unit communicates with and directs the actuators wirelessly.

4. The modular exoskeletal device as recited in claim 1 further comprising wires by which the control unit communicates with and directs the actuators.

5. The modular exoskeletal device as recited In claim 1 further comprising connecting rods engaging the actuators and providing additional structure for the device.

6. The modular exoskeletal device as recited in claim 5 further comprising at least one strap by which a connecting rod is affixed to a leg of the patient.

7. The modular exoskeletal device as recited in claim 1 further comprising a strap by which the back brace is affixed to the waist of the patient.

8. The modular exoskeletal device as recited in claim 1 wherein the actuators are rotary actuators located at any of the possible four hip and knee joints providing independent motion of those joints.

9. A modular exoskeletal device adapted to fit the lower extremities of a patient during rehabilitation, the device comprising:
    only two actuators during the standing stage of rehabilitation, the actuators affixed to and independently acting upon the patient and providing automatically controlled motion to at least one of the joints of the patient;
    connecting rods engaging the actuators and providing additional structure for the device;
    a stationary control unit (a) being separated from the patient, (b) communicating with and automatically directing the actuators without patient actuation, and (c) having a hybrid mathematical control algorithm, such that the actuator forces are adjusted as the patient regains control of some joint motions, based upon the sliding-mode control theory; and
    a back brace affixed to the patient, extending vertically between the waist and shoulders patient, and helping to keep the torso of the patient in a stable, substantially vertical position,
    wherein the modularity of the device permits incorporation of one or more additional actuators as needed by the patient.

10. The modular exoskeletal device as recited in claim 9 further comprising two additional actuators during the walking stage of rehabilitation.

11. The modular exoskeletal device as recited in claim 9 wherein the control unit communicates with and directs the actuators wirelessly.

12. The modular exoskeletal device as recited in claim 9 further comprising wires by which the control unit communicates with and directs the actuators.

13. The modular exoskeletal device as recited in claim 9 further comprising at least one leg strap by which a connecting rod is affixed to a leg of the patient.

14. The modular exoskeletal device as recited in claim 9 further comprising a waist strap by which the back brace is affixed to the waist of the patient.

15. The modular exoskeletal device as recited in claim 9 wherein the actuators are rotary actuators located at any of the possible four hip and knee joints providing independent motion of those joints.

16. A modular exoskeletal device adapted to fit the lower extremities of a patient during rehabilitation, the device comprising:

only two actuators during the standing stage of rehabilitation, the actuators affixed to and independently acting upon the patient and providing automatically controlled motion to at least one of the joints of the patient;

two additional actuators during the walking stage of rehabilitation;

connecting rods engaging the actuators and providing additional structure for the device;

leg straps encircling the legs of the patient by which the connecting rods are affixed to the patient;

a stationary control unit (a) being separated from the patient, (b) communicating with and automatically directing the actuators without patient actuation, and (c) having a hybrid mathematical control algorithm, such that the actuator forces are adjusted as the patient regains control of some joint motions, based upon the sliding-mode control theory;

wires connecting the control unit with the actuators and carrying signals between the control unit and the actuators;

a back brace affixed to the patient, extending vertically between the waist and shoulders of the patient, and helping to keep the torso of the patient in a stable, substantially vertical position; and a waist strap by which the back brace is affixed to the waist of the patient, wherein the modularity of the device permits incorporation of one or more additional actuators as needed by the patient.

17. The modular exoskeletal device as recited in claim 16 wherein the actuators are rotary actuators located at any of the possible four hip and knee joints providing independent motion of those joints.

* * * * *